(12) United States Patent
Yao et al.

(10) Patent No.: US 11,852,161 B1
(45) Date of Patent: Dec. 26, 2023

(54) TURBOMACHINE AND METHOD OF ASSEMBLY

(71) Applicant: General Electric Company, Schenectady, NY (US)

(72) Inventors: Jixian Yao, Niskayuna, NY (US); Trevor H. Wood, Clifton Park, NY (US); Kishore Ramakrishnan, Rexford, NY (US); William J. Solomon, Montgomery, OH (US); Giridhar Jothiprasad, Clifton Park, NY (US); Aaron J. King, West Harrison, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/138,442

(22) Filed: Apr. 24, 2023

Related U.S. Application Data

(63) Continuation-in-part of application No. 17/986,544, filed on Nov. 14, 2022, now Pat. No. 11,661,851.

(51) Int. Cl.
*F01D 5/14* (2006.01)
*F04D 29/38* (2006.01)
*F04D 19/00* (2006.01)

(52) U.S. Cl.
CPC ......... *F04D 29/384* (2013.01); *F04D 19/002* (2013.01)

(58) Field of Classification Search
None
See application file for complete search history.

(56) References Cited

U.S. PATENT DOCUMENTS

| | | | |
|---|---|---|---|
| 7,374,403 B2 * | 5/2008 | Decker | F01D 5/141 416/223 R |
| 8,678,743 B1 | 3/2014 | Sheridan | |
| 8,753,065 B2 | 6/2014 | Sheridan | |
| 8,807,916 B2 | 8/2014 | Sheridan | |
| 8,814,494 B1 | 8/2014 | Sheridan | |
| 8,973,374 B2 | 3/2015 | Sharma | |
| 9,816,443 B2 | 11/2017 | Sheridan | |
| 10,371,047 B2 | 8/2019 | Schwarz | |
| 10,458,426 B2 * | 10/2019 | Wilkin, II | F04D 29/325 |
| 10,823,052 B2 | 11/2020 | Schwarz | |

FOREIGN PATENT DOCUMENTS

| | | |
|---|---|---|
| CN | 103244350 | 8/2013 |
| EP | 2870346 | 5/2015 |
| WO | 2014008051 | 1/2014 |

OTHER PUBLICATIONS

M. Rodrigues, et al. "Aerodynamic Investigation of a Composite Low-Speed Fan for UHBR Application," Journal of Turbomachinery 143.10 (2021): 101004.

* cited by examiner

*Primary Examiner* — Kayla Mccaffrey
(74) *Attorney, Agent, or Firm* — Fitch, Even, Tabin & Flannery LLP

(57) ABSTRACT

A turbomachine includes an annular casing and a fan disposed inside the annular casing and mounted for rotation about an axial centerline. The fan includes fan blades that extend radially outwardly toward the annular casing. The fan has an average chord fan width according to a first performance factor. The fan has a quantity of fan blades according to a second performance factor.

25 Claims, 3 Drawing Sheets

TURBOMACHINE AND METHOD OF ASSEMBLY

CROSS REFERENCE TO RELATED APPLICATIONS

This application is a continuation-in-part of application Ser. No. 17/986,544, filed on Nov. 14, 2022, the content of which is incorporated herein by reference in its entirety.

FIELD

The present disclosure relates generally to jet engines and, more particularly, to jet engine fans.

BACKGROUND

In one form, a gas turbine engine can include a fan and a core arranged in flow communication with one another. The core generally includes, in serial flow order, a compressor section, a combustion section, a turbine section, and an exhaust section. The fan and the core may be partially surrounded by an outer nacelle. In such approaches, the outer nacelle defines a bypass airflow passage with the core.

In operation, air is provided from the fan to an inlet of the compressor section where one or more axial compressors progressively compress the air until it reaches the combustion section. Fuel is mixed with the compressed air using one or more fuel nozzles within the combustion section and burned to provide combustion gases. The combustion gases are routed from the combustion section to the turbine section. The flow of combustion gasses through the turbine section drives the turbine section and is then routed through the exhaust section to atmosphere.

BRIEF DESCRIPTION OF THE DRAWINGS

A full and enabling disclosure of the present disclosure, including the best mode thereof, directed to one of ordinary skill in the art, is set forth in the specification, with reference to the appended figures, in which.

Figure 1:
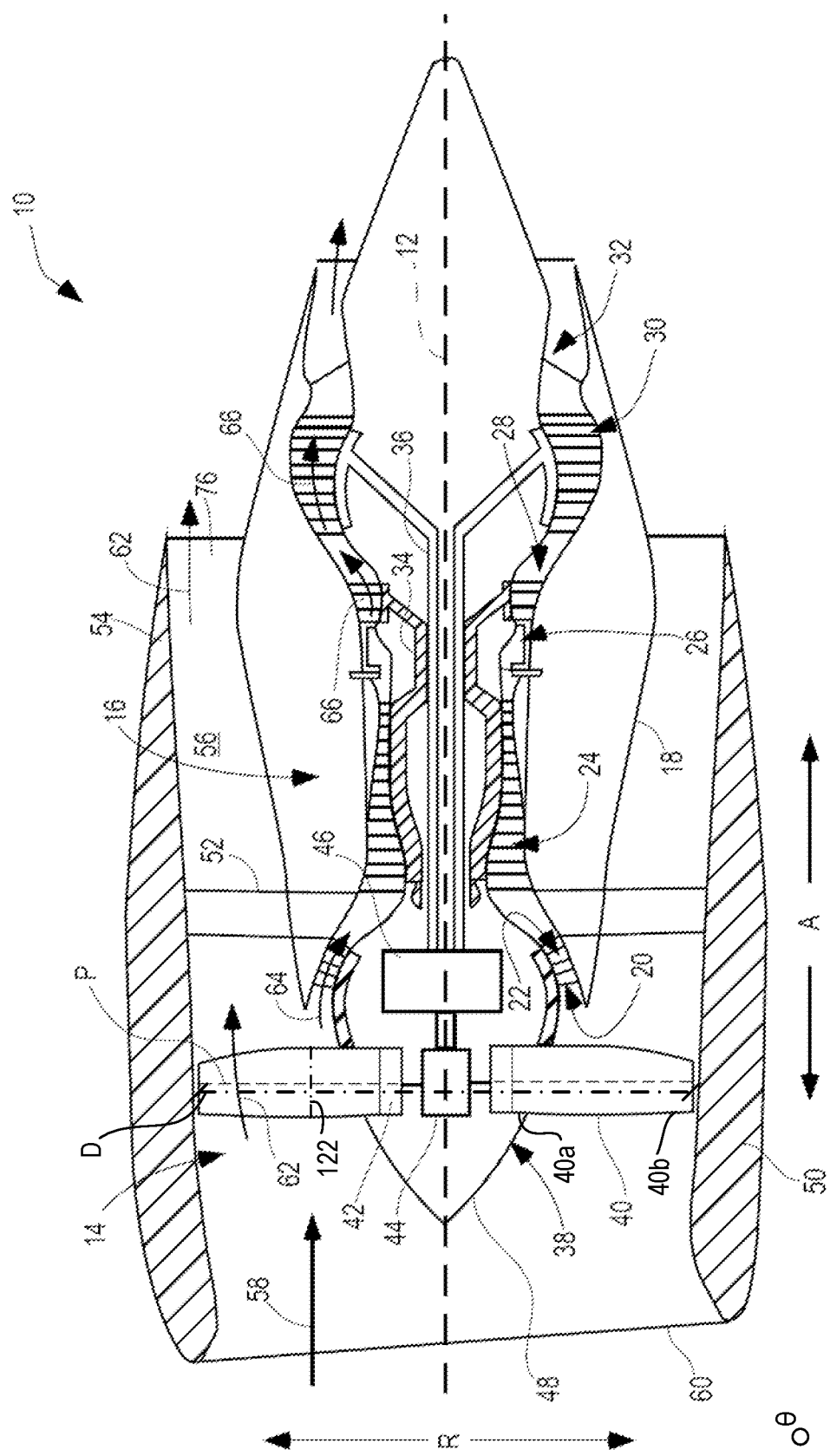
FIG. 1 is a schematic, cross-sectional view of a gas turbine engine in accordance with exemplary aspects of the present disclosure.

Elements in the figures are illustrated for simplicity and clarity and have not necessarily been drawn to scale. For example, the dimensions and/or relative positioning of some of the elements in the figures may be exaggerated relative to other elements to help to improve understanding of variations of the present disclosure. Also, common but well-understood elements that are useful or necessary in a commercially feasible embodiment are often not depicted in order to facilitate a less obstructed view of these variations of the present disclosure. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

The terms "radial" or "radially" refer to a direction away from a common center. For example, in the overall context of a turbine engine, radial refers to a direction along a ray extending between a center longitudinal axis of the engine and an outer engine circumference.

The term "composite," as used herein is, refers to a material that includes non-metallic elements or materials. As used herein, a "composite component" or "composite material" refers to a structure or a component including any suitable composite material. A composite material can be a combination of at least two or more non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials. Composite components, such as a composite airfoil, can include several layers or plies of composite material. The layers or plies can vary in stiffness, material, and dimension to achieve the desired composite component or composite portion of a component having a predetermined weight, size, stiffness, and strength. One or more layers of adhesive can be used in forming or coupling composite components. Adhesives can include resin and phenolics, wherein the adhesive can require curing at elevated temperatures or other hardening techniques.

As used herein, "PMC" refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part. Multiple layers of prepreg may be stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

The singular forms "a", "an", and "the" include plural references unless the context clearly dictates otherwise.

The inventors have sought to maximize efficiency of turbine engines during in-flight propulsion of an aircraft, and correspondingly reduce fuel consumption. In particular, the inventors were focused on how the fan of a ducted turbine engine can be improved. The inventors, in consideration of several different engine architectures proposed, considered how the fan module would need to change to achieve mission requirements, and/or how the fan module could improve upon an existing engine efficiency and/or fuel consumption. The inventors looked at several engine architectures, then determined how the number of fan blades utilized with a fan, average chord width of the fan blades, diameter of the fan blade, fan pressure ratio, fan tip speed, and hub-to-tip ratio affect engine efficiency and/or fuel consumption.

The inventors found that in some engines, an excess number of fan blades may add unnecessary cost to the engine design without appreciable benefit, and may also add unnecessary weight to an aircraft, thereby reducing overall fuel efficiency (e.g., due to increased fuel burn). A reduction in fan blade quantity, however, was found to potentially lead to a reduction in total fan blade area desired for efficient propulsion, fan aeromechanical stability and operability, etc. The inventors considered increasing the width or fan chord of the fan blades to achieve a desired fan blade area with a lower fan blade count. Such considerations were found to be of particular interest when the engine had a higher bypass ratio (i.e., lower fan pressure ratio), and when the engine had a lower blade tip speed.

The determination of the fan blade count and average fan chord for achieving a desired efficiency often required a time consuming, iterative process. As explained in greater detail below, after evaluation of numerous turbine engine architectures having different fan blade counts and average fan chords, it was found, unexpectedly, that there exist certain relationships between a fan or fan blade diameter, a fan pressure ratio, and a redline corrected fan tip Mach number of the turbine engine that identify an average fan chord needed to produce improved results in terms of engine efficiency. It was further found, unexpectedly, that there exist certain relationships between turbine engine parameters including a hub-to-tip ratio of the fan, a fan pressure ratio, and a redline corrected fan tip Mach number of the turbine engine that identify a fan blade count needed to produce improved results in terms of engine efficiency.

Various aspects of the present disclosure describe aspects of an aircraft turbine engine characterized in part by an increased average fan chord width and a reduced blade count, which are believed to result in an improved engine aerodynamic efficiency and/or improved fuel efficiency. According to the disclosure, a turbomachine for powering an aircraft in flight comprises an annular casing and a fan disposed inside the annular casing and mounted for rotation about an axial centerline, the fan including fan blades that extend radially outwardly toward the annular casing.

In one aspect, a First Performance Factor (FPF) for a fan module is expressed according to the inequality $$\left[\frac{c}{0.15 \cdot D}\right] / \left[\left[\frac{\sqrt{FPR-1}}{\sqrt{0.4}}\right] / M_{tip,c}^{(RL)}\right] - 1.23 > m_1 \cdot \left[M_{tip,c}^{(RL)} - 1.1\right] + dy_1.$$

In another aspect, a Second Performance Factor (SPF) for a fan module is expressed in terms of the inequality $$\sqrt{\frac{\pi}{4}(1-HTR^2)} / \left(\frac{BC}{20}\right) \left(\frac{\sqrt{FPR-1}}{\sqrt{0.4}}\right) / M_{tip,c}^{(RL)} - 0.97 >$$
$$m_2 \cdot \left[M_{tip,c}^{(RL)} - 1.1\right] + dy_2.$$

Reference will now be made in detail to embodiments of the disclosure, one or more examples of which are illustrated in the accompanying drawings, which are incorporated in and constitute a part of this specification, illustrate embodiments of the disclosure and, together with the description, serve to explain the principles of the disclosure. The detailed description uses numerical and letter designations to refer to features in the drawings. Like or similar designations in the drawings and description have been used to refer to like or similar parts of the disclosure.

Referring now to the drawings, wherein identical numerals indicate the same elements throughout the figures, FIG. 1 is a schematic, cross-sectional view of a turbomachine, more specifically a gas turbine engine, in accordance with an exemplary embodiment of the present disclosure. More particularly, for the embodiment of FIG. 1, the gas turbine engine is a high-bypass turbofan jet engine 10, referred to herein as "turbofan jet engine 10." As shown in FIG. 1, the turbofan jet engine 10 defines an axial direction A (extending parallel to a longitudinal centerline 12 provided for reference) and a radial direction R. In general, the turbofan jet engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the high pressure turbine 28 to the high pressure compressor 24. A low pressure (LP) shaft or spool 36 drivingly connects the low pressure turbine 30 to the low pressure compressor 22.

Fan blades 40 extend outwardly from disk 42 generally along the radial direction R. For the embodiment depicted, the fan section 14 includes a variable pitch fan 38 having a plurality of fan blades 40 coupled to a disk 42 in a spaced apart manner. One or more of the fan blades 40 may rotatable relative to the disk 42 about a pitch axis P by virtue of the fan blades 40 being operatively coupled to a suitable actuation member 44 configured to vary the pitch of the fan blades 40, typically collectively in unison. In some approaches, the fan is a fixed pitch fan and actuation member 44 is not present. The fan blades 40, disk 42, and actuation member 44 may be together rotatable about the longitudinal centerline 12 by low pressure spool 36 across a power gear box 46. The power gear box 46 includes a plurality of gears for stepping down the rotational speed of the low pressure spool 36 to a more efficient rotational fan speed. In some approaches, the low pressure spool 36 may directly drive the fan without power gear box 46.

The power gear box 46 can include a plurality of gears, including an input and an output, and may also include one or more intermediate gears disposed between and/or interconnecting the input and the output. The input can comprise a first rotational speed and the output can have a second rotational speed. In some examples, a gear ratio of the first rotational speed to the second rotational speed is equal to or greater than 3.2 and equal to or less than 5.0 The power gear box 46 can comprise various types and/or configurations. In some examples, the power gear box 46 is a single-stage gear box. In other examples, the power gear box 46 is a multi-stage gear box. In some examples, the power gear box 46 is an epicyclic gearbox. In some examples, the power gear box 46 is a non-epicyclic gear box (e.g., a compound gearbox). More particularly, in some instances, the power gear box 46 is an epicyclic gear box configured in a star gear configuration. Star gear configurations comprise a sun gear, a plurality of star gears (which can also be referred to as "planet gears"), and a ring gear. The sun gear is the input and is coupled to the power turbine (e.g., the low-pressure turbine) such that the sun gear and the power turbine rotate at the same rotational speed. The star gears are disposed between and interconnect the sun gear and the ring gear. The star gears are rotatably coupled to a fixed carrier. As such, the star gears can rotate about their respective axes but cannot collectively orbit relative to the sun gear or the ring gear. As another example, the power gear box 46 is an epicyclic gear box configured in a planet gear configuration. Planet gear configurations comprise a sun gear, a plurality of planet gears, and a ring gear. The sun gear is the input and is coupled to the power turbine. The planet gears are disposed between and interconnect the sun gear and the ring gear. The planet gears are rotatably coupled to a rotatable carrier. As such, the planet gears can rotate about their respective axes and also collectively rotate together with the carrier relative to the sun gear and the ring gear. The carrier is the output and is coupled to the fan assembly. The ring gear is fixed from rotation.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially spaced outlet guide vanes 52. Moreover, a downstream section 54 of the outer nacelle 50 may extend over an outer portion of the core turbine engine 16 so as to define a bypass airflow passage 56 therebetween.

During operation of the turbofan jet engine 10, a volume of air 58 enters the turbofan jet engine 10 through an associated inlet 60 of the outer nacelle 50 and/or fan section 14. As the volume of air 58 passes across the fan blades 40, a first portion 62 of the air 58 as indicated by arrow 62 is directed or routed into the bypass airflow passage 56 and a second portion 64 of the air 58 as indicated by arrow 64 is directed or routed into the low pressure compressor 22. The ratio between the first portion 62 of air 58 and the second portion 64 of air 58 is commonly known as a bypass ratio. The pressure of the second portion 64 of air 58 is then increased as it is routed through the high pressure (HP) compressor 24 and into the combustion section 26, where it is mixed with fuel and burned to provide combustion gases 66. Subsequently, the combustion gases 66 are routed through the high pressure turbine 28 and the low pressure turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before it is exhausted from a fan nozzle exhaust section 76 of the turbofan jet engine 10, also providing propulsive thrust.

It should be appreciated, however, that the turbofan jet engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan jet engine 10 may instead be any other suitable aeronautical gas turbine engine, such as a turbojet engine, turboshaft engine, turboprop engine, etc. Additionally, in still other exemplary embodiments, the turbofan jet engine 10 may include or be operably connected to any other suitable accessory systems. Additionally, or alternatively, the exemplary turbofan jet engine 10 may not include or be operably connected to one or more of the accessory systems discussed above.

The fan blades 40 of the jet engine 10 may be made from a PMC material with metal leading edges to protect the airfoil from foreign objects, such as bird strikes. A polymer matrix composite (PMC) material for the airfoil can be more durable and/or exhibit improved performance when the airfoil is subjected to flutter effects during operation. In some embodiments, engines with fewer fan blades (e.g., less than 25 fan blades) and wider chords (c), such as engines having a blade count (BC) from 14 and 18, or 16 to 20 fan blades and ratios of chord to diameter (c/D) of greater than 0.17, or greater than 0.19, and less than 0.3 (e.g., less than 0.21) have the fan blade airfoil made from a PMC material with metal leading edge.

Figure 2:
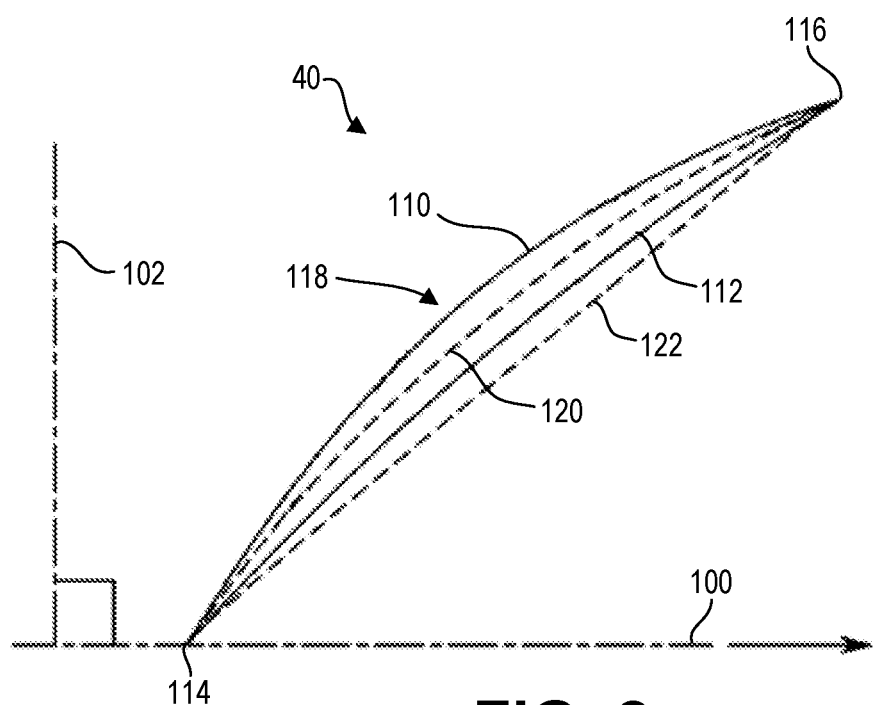
FIG. 2 is a sectional view of a fan blade in accordance with exemplary aspects of the present disclosure.

FIG. 2 is a sectional view of a fan blade 40 viewed radially (e.g., towards the rotation axis). A first axis 100 is parallel to the axial direction A of FIG. 1, and a second axis 102 is parallel to the circumferential direction θ.

Fan blade 40 includes a low-pressure surface 110 and an opposite high-pressure surface 112 that each extend between a proximal end 40a and a distal end 40b of the fan blade 40 (shown in FIG. 1). Fan blade 40 further includes a leading edge 114 and a trailing edge 116.

The low-pressure surface 110, high-pressure surface 112, leading edge 114, and trailing edge 116 form a profile 118 of the fan blade 40. The profile 118 defines a mean camber 120 that extends from the leading edge 114 to the trailing edge 116 and that is equidistant from the low-pressure surface 110 and the high-pressure surface 112.

The profile 118 further defines a local chord 122 (relative to a specific cross section through the blade) that represents a straight-line distance from the leading edge 114 to the trailing edge 116.

In some approaches, a fan blade 40 may have a profile 118 that varies along a radial height of the fan blade 40 between the proximal end 40a and the distal end 40b. For example, in some fan blade designs, a distance between the leading edge 114 and the trailing edge 116 may be greater at the proximal end 40a of the fan blade 40 than at the distal end 40b. As such, the length of the chord line 122 may vary along the radial height of the fan blade 40. In this way, an average chord line length may be derived for the fan blade that accounts for the variation in chord line lengths 122 along the radial height of the fan blade 40.

As mentioned earlier, the inventors have discovered relationships between timescales that include a fan pressure ratio, fan diameter, and corrected fan tip Mach number during the course of improving upon the fan module portion of various engine architectures. More particularly, and as discussed in greater detail below, the inventors have discovered relationships between ratio of axial flow timescales to rotation timescales, and suitable parameters for implementing those relationships with an engine.

The aircraft turbine engine architectures developed by the inventors include as major components a fan module and an engine core. The core includes one or more compressor stages and turbine stages. Compressor stages typically include high pressure and low pressure compressor stages, and turbines similarly include high and low pressure stages. The fan module that provides for an improved efficiency is not independent of these other parts of the engine, because there is always a trade benefit when one part is improved or modified. Improved efficiency brought by the fan can be in terms of a reduction in weight, lower installed drag, load balancing or management (dynamic or static loading), aerodynamic efficiency through the fan duct/interaction of fan to output guide vanes, and other factors. In an effort to improve upon what the fan can deliver (positive benefit of fan design) there often times need to be sacrifices in other parts of the engine (negative benefit of fan design). Or the benefits of a new fan design when viewed independent of a particular core design or airframe requirement, often times requires revision or is unrealistic given the impact that such a fan design will have on other parts of the engine, e.g., compressor operating margin, balance of a fan and output guide vanes (OGV) along with a power gearbox, and location of a low pressure compressor (packaging impacts). The teachings described herein are also applicable to other engine architectures such as electrically-driven fans (which may or may not include a turbine) and hybrid electrically-driven fans (e.g., distributed electric propulsion systems in which a gas turbine drives multiple fans).

The inventors, proceeding in the manner of designing improved fan modules, accounting for the trade-offs between fan module improvements and other potentially negative or limitations on fan module design, unexpectedly found certain relationships that define an improved fan design, now described in detail.

In one aspect, the inventors have discovered a relationship between an average fan chord "c", a fan diameter "D" (e.g., a tip-to-tip dimension of the fan), a fan pressure ratio "FPR" of a fan, and a corrected redline fan tip Mach number "$M_{tip,c}^{(RL)}$" according to the below relationship, referred to herein as the First Performance Factor ("FPF") for a fan module:

$$FPF = \left[\frac{c}{0.15 \cdot D}\right] / \left[\left[\frac{\sqrt{FPR-1}}{\sqrt{0.4}}\right] / M_{tip,c}^{(RL)}\right] - 1.23 \quad (1)$$

$$m_1 \cdot \left[M_{tip,c}^{(RL)} - 1.1\right] + 6 > FPF > m_1 \cdot \left[M_{tip,c}^{(RL)} - 1.1\right] + \Delta y_1 \quad (2)$$

The ratio of average fan chord "c" to fan diameter "D" is a nondimensionalized chord width ratio greater than 0.1 (e.g., greater than 0.15, greater than 0.17, or greater than 0.19), and less than 0.3 (e.g., less than 0.21).

As used herein, the "fan pressure ratio" (FPR) refers to a ratio of a stagnation pressure immediately downstream of the plurality of outlet guide vanes 52 during operation of the fan 38 to a stagnation pressure immediately upstream of the plurality of fan blades 40 during the operation of the fan 38. The "$\sqrt{FPR-1}$" portion of the average fan chord relationship may be utilized as a surrogate for referencing a proportionality to the increase in axial flow velocity through the fan. The fan pressure ratio is greater than 1.2 (e.g., greater than 1.3), and less than 1.5 (e.g., less than 1.45, less than 1.42, or less than 1.4).

As used herein, "$M_{tip,c}^{(RL)}$" is a corrected fan tip Mach number at redline (e.g., maximum permissible rotational speed of the fan at a redline shaft speed, which is either directly coupled to the fan or through a reduction gearbox). "Fan tip speed" refers to a linear speed of an outer tip of a fan blade 40 during operation of the fan 38. "Corrected fan tip speed" (referred to as "$U_{tip,c}$") may be provided, for example, as ft/sec divided by an industry standard temperature correction. In an example approach, $U_{tip,c}$ may be less than 1,500 ft/sec (e.g., less than 1,250 ft/sec or less than 1,100 ft/sec), and greater than 500 ft/sec. "Corrected fan tip Mach number" refers to a nondimensionalized value obtained by dividing $U_{tip,c}$ by the generally accepted speed of sound at standard day sea level atmospheric conditions (i.e., 1,116.45 ft/sec). As such, $M_{tip,c}^{(RL)}$ may be less than 1.34 (e.g., less than 1.12 or less than 0.99), and greater than 0.45.

FPF, as defined in (1), may be thought of as representing a ratio of speeds. When considered with the normalized chord width "c/D," FPF may be thought of as a correlation of timescales of the blade rotation with the time taken for a flow particle to traverse a fan average chord length when the engine is operating at static conditions.

Figure 3:
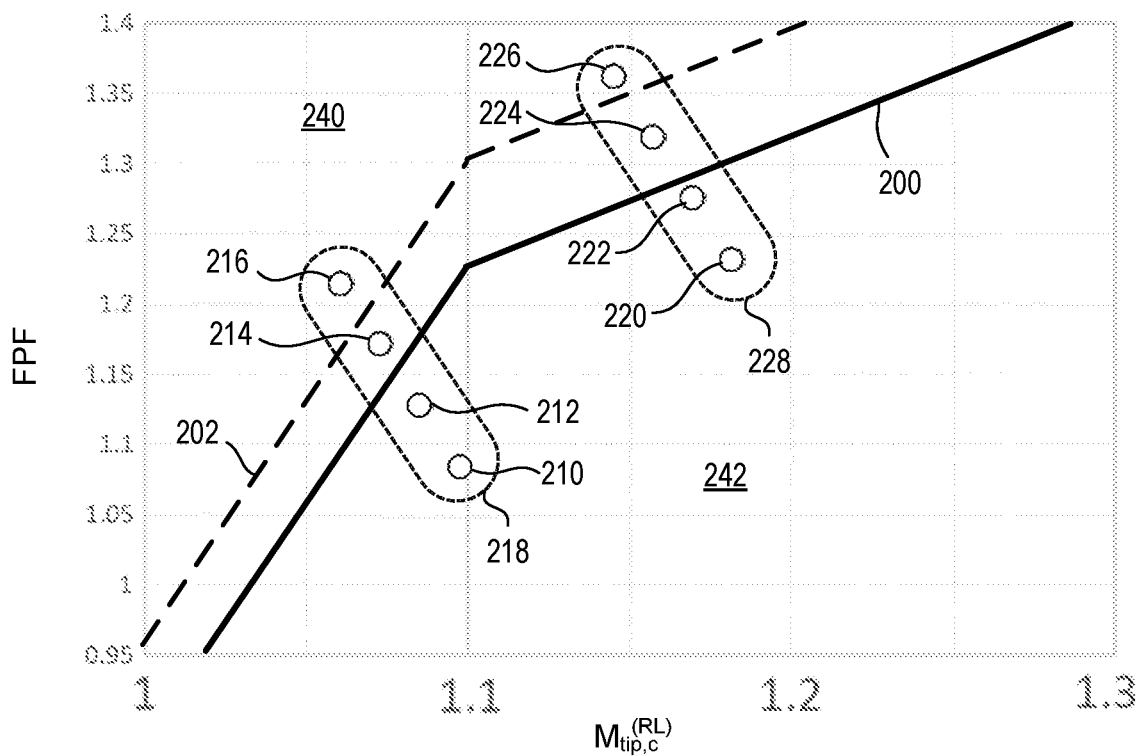
FIG. 3 shows first example engines arranged on a first plot in accordance with a first performance factor for a fan module according to the present disclosure.

Referring to the inequality defined in (2) and to the plot of FIG. 3, example engine embodiments are shown having unique FPF values and corresponding redline corrected fan tip Mach number ($M_{tip,c}^{(RL)}$). FPF increases in value along the Y-axis, while the X-axis represents left-to-right increasing redline corrected fan tip Mach number ($M_{tip,c}^{(RL)}$). FIG. 3 also shows a first line 200 and a second line 202 that is offset from the first line 200 along the Y-axis. The first and second lines 200, 202 are defined by the "$m_1 \cdot [M_{tip,c}^{(RL)}-1.1]+\Delta y_1$" portion of inequality (2). As used herein, "$m_1$" refers to a slope of a line 200, 202, "1.1" refers to a reference corrected redline tip Mach number at which Y-intercept is defined in the FPF, and $\Delta y_1$ refers an offset from the Y-intercept along the Y-axis.

As shown in FIG. 3, the first and second lines 200, 202 are piecewise linear dividing curves; i.e., the first and second lines 200, 202 have different slopes "$m_1$" depending on the $M_{tip,c}^{(RL)}$ along the X-axis. More particularly, when the value of $M_{tip,c}^{(RL)}$ is equal to or greater than 1.1, the first and second lines 200, 202 have slopes "$m_1$" equal to 0.87. When the value of $M_{tip,c}^{(RL)}$ is less than 1.1, the first and second lines 200, 202 have slopes "$m_1$" equal to 3.34. While depicted as piecewise linear dividing curves, the low-speed scaling is actually nonlinear and there are advantages to lower c/D designs toward the lower portion of the plot of FIG. 3 associated with lower FPR and lower $M_{tip,c}^{(RL)}$.

As discussed, $\Delta y_1$ refers an offset from the Y-intercept along the Y-axis. The $\Delta y_1$ value can be 0.0125, 0.04, 0.07, 0.1, or 0.2, or can vary between 0 and 6, 0 and 0.0125, 0.0125 and 0.04, 0.04 and 0.07, 0.07 and 0.1, 0.1 and 0.2, or a value greater than 0.2 and less than 6.

FIG. 3 shows eight example engine embodiments, of which engines 210, 212, 214, 216 may be referred to as low speed engine designs (as indicated by subplot area 218), and engines 220, 222, 224, 226 may be referred to as high speed engine designs (as indicated by subplot area 228). Each of the engines 210, 212, 214, 216, 220, 222, 224, 226 have a gear ratio in a range equal to or greater than 3.2 and less than or equal to 5.0.

As represented by the FPF, which indicates a particular fan chord relationship, the inventors discovered a limited or narrowed selection of average fan chords that uniquely take into consideration other factors associated with the fan and engine type. For instance, the inventors determined that an engine having an FPF value for a given $M_{tip,c}^{(RL)}$ value above line 200 (within plot area 240) may allow for relatively wider chord widths as compared to engines having an FPF value for a given $M_{tip,c}^{(RL)}$ value below line 200 (within plot area 242). In this way, engines 214, 216, 224, and 226 may provide advantages over engines 210, 212, 220, and 222, such as a reduced fan blade count (discussed in greater detail below), increased aeromechanical stability and reduced fan lift coefficient CL during takeoff of the aircraft. In some instances, such advantages may become more pronounced as FPF increases and $M_{tip,c}^{(RL)}$ value decreases (for next generation ultra-high bypass ratio engines for instance). For example, the improvement in engine performance based on the redline tip Mach number may have FPF values greater than $m_1 \cdot [M_{tip,c}^{(RL)}-1.1]+0.0125$, greater than $m_1 \cdot [M_{tip,c}^{(RL)}-1.1]+0.04$, greater than $m_1 \cdot [M_{tip,c}^{(RL)}-1.1]+0.07$ greater than $m_1 \cdot [M_{tip,c}^{(RL)}-1.1]+0.1$, or greater than $m_1 \cdot [M_{tip,c}^{(RL)}-1.1]+0.2$ (these other examples are schematically represented by the phantom line 202).

In another aspect, the inventors have discovered a relationship between a fan blade count "BC", a hub-to-tip ratio of a fan "HTR", a fan pressure ratio "FPR" of a fan, and a corrected redline fan tip Mach number "$M_{tip,c}^{(RL)}$" according to the below relationship, referred to herein as the Second Performance Factor ("SPF") for a fan module:

$$SPF = \sqrt{\frac{\pi}{4}(1-HTR^2)} / \left(\frac{BC}{20}\right) \left(\frac{\sqrt{FPR-1}}{\sqrt{0.4}}\right) / M_{tip,c}^{(RL)} - 0.97 \quad (3)$$

$$m_2 \cdot [M_{tip,c}^{(RL)}-1.1]+1.5 > SPF > m_2 \cdot [M_{tip,c}^{(RL)}-1.1]+\Delta y_2 \quad (4)$$

Regarding the hub-to-tip ratio "HTR," a fan blade defines a hub radius ($R_{hub}$), which is the radius of the leading edge at the hub relative to a centerline of the fan, and a tip radius ($R_{tip}$), which is the radius of the leading edge at a tip of the fan blade relative to the centerline of the fan. HTR is the ratio of the hub radius to the tip radius ($R_{hub}/R_{tip}$). The ratio is greater than 0.1 and less than 0.5 (e.g., less than 0.275, less than 0.25, or less than 0.225).

Blade count "BC" corresponds to the number of fan blades circumferentially arranged about the fan hub. The blade count is between 10 fan blades and 40 fan blades. In certain example approaches, the blade count is less than or equal to 18 fan blades (e.g., 16 or fewer fan blades).

"FPR" and "$M_{tip,c}^{(RL)}$" refer to a fan pressure ratio and a redline corrected fan tip Mach number, respectively, as discussed with respect to the average fan chord relationship above. In this way, the values of one or more of the FPR and "$M_{tip,c}^{(RL)}$", may be the same as those discussed with respect to the average fan chord relationship.

Figure 4:
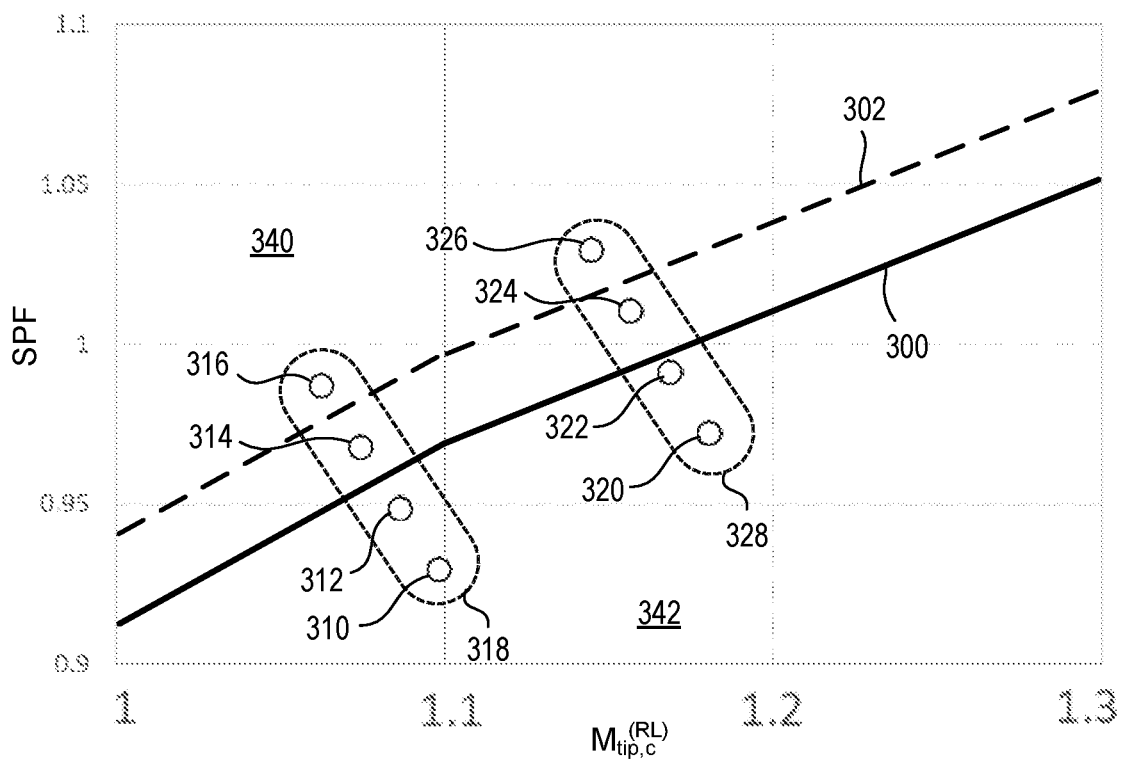
FIG. 4 shows second example engines arranged on a second plot in accordance with a second performance factor for a fan module according to the present disclosure.

Referring to the inequality defined in (4) and to the plot of FIG. 4, example engine embodiments are shown having unique SPF values and corresponding redline corrected fan tip Mach number ($M_{tip,c}^{(RL)}$). SPF increases in value along the Y-axis, while the X-axis represents left-to-right increasing redline corrected fan tip Mach number ($M_{tip,c}^{(RL)}$). FIG. 4 also shows a first line 300 and a second line 302 that is offset from the first line 300 along the Y-axis. The first and second lines 300, 302 are defined by the "$m_2 \cdot [M_{tip,c}^{(RL)}-1.1]+\Delta y_2$" portion of inequality (4).

As shown in FIG. 4, the first and second lines 300, 302 are piecewise linear dividing curves; i.e., the first and second lines 300, 302 have different slopes "$m_2$" depending on the $M_{tip,c}^{(RL)}$ along the X-axis. More particularly, when the value of $M_{tip,c}^{(RL)}$ is equal to or greater than 1.1, the first and second lines 300, 302 have slopes "$m_2$" equal to 0.41. When the value of $M_{tip,c}^{(RL)}$ is less than 1.1, the first and second lines 300, 302 have slopes "$m_2$" equal to 0.55.

As used herein, "$m_2$" refers to a slope of a line 300, 302, which as shown, is equal to 1. "1.1" refers to a reference corrected redline tip Mach number at which the Y-intercept is defined, and $\Delta y_2$ refers an offset from the Y-intercept along the Y-axis. The $\Delta y_2$ value can be 0.0075, 0.01, 0.02, 0.024, 0.037, 0.04, or 0.06, or can vary between 0 and 1.5, 0 and 0.0075, 0.0075 and 0.01, 0.01 and 0.2, 0.2 and 0.024, 0.024 and 0.037, 0.037 and 0.04, 0.04 and 0.6, or a value greater than 0.6 and less than 1.5.

FIG. 4 shows eight example engine embodiments, of which engines 310, 312, 314, 316 may be referred to as low speed engine designs (as indicated by subplot area 318), and engines 320, 322, 324, 326 may be referred to as high speed engine designs (as indicated by subplot area 328). Each of the engines 310, 312, 314, 316, 320, 322, 324, 326 have a gear ratio a range equal to or greater than 3.2 and less than or equal to 5.0.

As represented by the SPF, which indicates a particular fan blade count relationship, the inventors discovered a limited or narrowed selection of fan blade count that uniquely take into consideration other factors associated with the fan and engine type. For instance, the inventors determined that an engine having an SPF value for a given $M_{tip,c}^{(RL)}$ value above line 300 (within plot area 340) may allow for reduced fan blade counts as compared to engines having an SPF value fora given $M_{tip,c}^{(RL)}$ value below line 300 (within plot area 342). In this way, engines 314, 316, 324, and 326 may provide advantages over engines 310, 312, 320, and 322, such as a reduced cost and weight. In some instances, such advantages may become more pronounced as the SPF value increases and the $M_{tip,c}^{(RL)}$ value decreases (for next generation ultra-high bypass ratio engines for instance). For example, the improvement in engine performance based on the redline tip Mach number may have SPF values greater than $m_2 \cdot [M_{tip,c}^{(RL)} - 1.1] + 0.0075$, greater than $m_2 \cdot [M_{tip,c}^{(RL)} - 1.1] + 0.01$, greater than $m_2 \cdot [M_{tip,c}^{(RL)} - 1.1] + 0.02$, greater than $m_2 \cdot [M_{tip,c}^{(RL)} - 1.1] + 0.024$, greater than $m_2 \cdot [M_{tip,c}^{(RL)} - 1.1] + 0.037$, greater than $m_2 \cdot [M_{tip,c}^{(RL)} - 1.1] + 0.04$, or greater than $m_2 \cdot [M_{tip,c}^{(RL)} - 1.1] + 0.06$ (these other examples are schematically represented by the phantom line 302).

In this way, using fan parameters such as fan pressure ratios, corrected fan tip Mach number, fan diameters, and hub-to-tip ratios, the inventors discovered approaches that utilize the above-described average fan chord relationship to obtain an average chord width, and the above-described fan blade count relationship to obtain a fan blade count. These obtained constraints guide one to select fan chord width, blade count, or both suited for the particularized engine architectures and mission requirements, informed by engine-unique environments and trade-offs in design (as discussed above), which are believed to result in an improved engine.

In another aspect, the FPF and SPF may also be useful as a design tool for down-selecting, or providing a guideline for reducing the number of candidate designs for fan blade counts and average fan chords from which to design a fan module for a particular architecture. In this way, an engine architecture is improved overall by knowing, early in the design process, what constraints or limitations would be imposed by a fan module given the mission objectives.

In another aspect method of assembly is provided. The method includes mounting a fan inside an annular casing for rotation about an axial centerline. The fan including fan blades that extend radially outwardly toward the annular casing. The fan further includes an average fan chord width according to the First Performance Factor ("FPF") and/or a quantity of fan blades according to the Second Performance Factor ("SPF") discussed above.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbomachine for an aircraft, comprising: an annular casing; and a fan disposed inside the annular casing and mounted for rotation about an axial centerline, the fan including fan blades that extend radially outwardly toward the annular casing; wherein the fan includes an average fan chord width of the fan blades ("c"), a diameter of the fan ("D"), a fan pressure ratio ("FPR"), and a redline corrected fan tip Mach number ("$M_{tip,c}^{(RL)}$"), according to a First Performance Factor; wherein $$FPF = \left[\frac{c}{0.15 \cdot D}\right] / \left[\left[\frac{\sqrt{FPR-1}}{\sqrt{0.4}}\right] / M_{tip,c}^{(RL)}\right] - 1.23,$$

and wherein $m_1 \cdot [M_{tip,c}^{(RL)} - 1.1] + 6 > FPF > m_1 \cdot [M_{tip,c}^{(RL)} - 1.1] + \Delta y_1$, and wherein $0 < \Delta y_1 < 6$.

The turbomachine of one or more of these clauses wherein $M_{tip,c}^{(RL)}$ is within a range equal to or greater than 0.45 and equal to or less than 1.34.

The turbomachine of one or more of these clauses wherein $M_{tip,c}^{(RL)}$ is within a range equal to or greater than 0.45 and equal to or less than 1.12.

The turbomachine of one or more of these clauses wherein $m_1$ is equal to 0.87 when $M_{tip,c}^{(RL)}$ is greater than or equal to 1.1.

The turbomachine of one or more of these clauses wherein $m_1$ is equal to 1.0 when $M_{tip,c}^{(RL)}$ is greater than or equal to 1.1.

The turbomachine of one or more of these clauses wherein $m_1$ is equal to 2.5 when $M_{tip,c}^{(RL)}$ is less than 1.1.

The turbomachine of one or more of these clauses wherein $m_1$ is equal to 3.34 when $M_{tip,c}^{(RL)}$ is less than 1.1.

The turbomachine of one or more of these clauses wherein $\Delta y_1$ is equal to or greater than 0.0125 and less than 6.

The turbomachine of one or more of these clauses wherein $\Delta y_1$ is equal to or greater than 0.04 and less than 6.

The turbomachine of one or more of these clauses wherein $\Delta y_1$ is equal to or greater than 0.07 and less than 6.

The turbomachine of one or more of these clauses wherein $\Delta y_1$ is equal to or greater than 0.1 and less than 6.

The turbomachine of one or more of these clauses wherein $\Delta y_1$ is equal to or greater than 0.2 and less than 6.

The turbomachine of one or more of these clauses wherein the turbomachine has a gear ratio within a range equal to or greater than 3.2 and equal to or less than 5.0.

The turbomachine of one or more of these clauses wherein the fan blade includes an airfoil portion made from a polymer matrix composite (PMC) material, a metallic leading edge, the ratio c/D is between 0.16 and 0.21, and the fan has between 16 and 25 fan blades.

The turbomachine of one or more of these clauses wherein ratio c/D is within a range equal to or greater than 0.1 and equal to or less than 0.3.

The turbomachine of one or more of these clauses wherein ratio c/D is within a range equal to or greater than 0.15 and equal to or less than 0.21.

The turbomachine of one or more of these clauses wherein ratio c/D is equal to or greater than 0.1.

The turbomachine of one or more of these clauses wherein ratio c/D is equal to or less than 0.3.

The turbomachine of one or more of these clauses wherein FPR is within a range equal to or greater than 1.2 and equal to or less than 1.5.

The turbomachine of one or more of these clauses wherein FPR is within a range equal to or greater than 1.3 and equal to or less than 1.45.

The turbomachine of one or more of these clauses wherein FPR is equal to or greater than 1.2.

The turbomachine of one or more of these clauses wherein FPR is equal to or greater than 1.3.

The turbomachine of one or more of these clauses wherein FPR is equal to or less than 1.5.

The turbomachine of one or more of these clauses wherein FPR is equal to or less than 1.45.

The turbomachine of one or more of these clauses wherein $U_{c(tip)}$ is within a range equal to or greater than 500 ft/sec and equal to or less than 1,500 ft/sec.

The turbomachine of one or more of these clauses wherein $U_{c(tip)}$ is within a range equal to or greater than 500 ft/sec and equal to or less than 1,250 ft/sec.

A turbomachine comprising: an annular casing; and a fan disposed inside the annular casing and mounted for rotation about an axial centerline, the fan including fan blades that extend radially outwardly toward the annular casing; wherein the fan includes a fan hub-to-tip ratio ("HTR"), a fan blade count ("BC"), a fan pressure ratio ("FPR"), and a redline corrected redline fan tip Mach number ("$M_{tip,c}^{(RL)}$") according to a Second Performance ("SPF"), $$SPF = \sqrt{\frac{\pi}{4}(1 - HTR^2)} \Big/ \left(\frac{BC}{20}\right)\left(\frac{\sqrt{FPR-1}}{\sqrt{0.4}}\right)\Big/ M_{tip,c}^{(RL)} - 0.97,$$

wherein $m_2 \cdot [M_{tip,c}^{(RL)} - 1.1] + 1.5 > SPF > m_2 \cdot [M_{tip,c}^{(RL)} - 1.1] + \Delta y_2$, and wherein $0 < \Delta y_2 < 1.5$.

The turbomachine of one or more of these clauses wherein $\Delta y_2$ is equal to or greater than 0.0075 and less than 1.5.

The turbomachine of one or more of these clauses wherein $\Delta y_2$ is equal to or greater than 0.01 and less than 1.5.

The turbomachine of one or more of these clauses wherein $\Delta y_2$ is equal to or greater than 0.02 and less than 1.5.

The turbomachine of one or more of these clauses wherein $\Delta y_2$ is equal to or greater than 0.024 and less than 1.5.

The turbomachine of one or more of these clauses wherein $\Delta y_2$ is equal to or greater than 0.037 and less than 1.5.

The turbomachine of one or more of these clauses wherein $\Delta y_2$ is equal to or greater than 0.04 and less than 1.5.

The turbomachine of one or more of these clauses wherein $\Delta y_2$ is equal to or greater than 0.06 and less than 1.5.

The turbomachine of one or more of these clauses wherein 1112 is equal to 0.41 when $M_{tip,c}^{(RL)}$ is greater than or equal to 1.1.

The turbomachine of one or more of these clauses wherein 1112 is equal to 0.55 when $M_{tip,c}^{(RL)}$ is less than 1.1.

The turbomachine of one or more of these clauses wherein HTR is within a range equal to or greater than 0.1 and equal to or less than 0.5.

The turbomachine of one or more of these clauses wherein HTR is within a range equal to or greater than 0.2 and equal to or less than 0.275.

The turbomachine of one or more of these clauses wherein HTR is within a range equal to or greater than 0.2 and equal to or less than 0.25.

The turbomachine of one or more of these clauses wherein HTR is equal to or greater than 0.1.

The turbomachine of one or more of these clauses wherein HTR is equal to or less than 0.5.

The turbomachine of one or more of these clauses wherein BC is within a range equal to or greater than 10 and equal to or less than 18.

The turbomachine of one or more of these clauses wherein FPR is within a range equal to or greater than 1.2 and equal to or less than 1.5.

The turbomachine of one or more of these clauses wherein FPR is within a range equal to or greater than 1.3 and equal to or less than 1.45.

A method of assembly, comprising: mounting a fan inside an annular casing for rotation about an axial centerline, the fan including fan blades that extend radially outwardly toward the annular casing; wherein the fan includes an average fan chord width of the fan blades ("c"), a diameter of the fan ("D"), a fan pressure ratio ("FPR"), and a redline corrected fan tip redline Mach number ("$M_{tip,c}^{(RL)}$") according to a First Performance Factor ("FPF"), wherein:

$$FPF = \left[\frac{c}{0.15 \cdot D}\right] \Big/ \left[\left[\frac{\sqrt{FPR-1}}{\sqrt{0.4}}\right] \Big/ M_{tip,c}^{(RL)}\right] - 1.23;$$

$m_1 \cdot [M_{tip,c}^{(RL)} - 1.1] + 6 > FPF > m_1 \cdot [M_{tip,c}^{(RL)} - 1.1] + \Delta y_1$; and $0 < \Delta y_1 < 6$; or wherein the fan includes a fan hub-to-tip ratio ("HTR"), a fan blade count ("BC"), FPR, and $M_{tip,c}^{(RL)}$ according to a Second Performance Factor ("SPF"), wherein:

$$SPF = \sqrt{\frac{\pi}{4}(1 - HTR^2)} \Big/ \left(\frac{BC}{20}\right)\left(\frac{\sqrt{FPR-1}}{\sqrt{0.4}}\right)\Big/ M_{tip,c}^{(RL)} - 0.97;$$

$$m_2 \cdot [M_{tip,c}^{(RL)} - 1.1] + 1.5 > SPF > m_2 \cdot [M_{tip,c}^{(RL)} - 1.1] + \Delta y_2;$$

and $0 < \Delta y2 < 1.5$.

What is claimed is:

1. A turbomachine for an aircraft comprising:
an annular casing; and
a fan disposed inside the annular casing and mounted for rotation about an axial centerline, the fan including fan blades that extend radially outwardly toward the annular casing;
wherein the fan includes an average fan chord width of the fan blades ("c"), a diameter of the fan ("D"), a fan pressure ratio ("FPR"), and a redline corrected fan tip Mach number ("$M_{tip,c}^{(RL)}$") according to a First Performance Factor ("FPF"),
wherein $$FPF = \left[\frac{c}{0.15 \cdot D}\right] / \left[\left[\frac{\sqrt{FPR-1}}{\sqrt{0.4}}\right] / M_{tip,c}^{(RL)}\right] - 1.23,$$

wherein $m_1 \cdot [M_{tip,c}^{(RL)} - 1.1] + 6 > FPF > m_1 \cdot [M_{tip,c}^{(RL)} - 1.1] + \Delta y_1$, and wherein $0 < \Delta y_1 < 6$.

2. The turbomachine of claim 1, wherein $M_{tip,c}^{(RL)}$ is within a range equal to or greater than 0.45 and equal to or less than 1.34.

3. The turbomachine of claim 1, wherein $m_1$ is equal to 0.87 when $M_{tip,c}^{(RL)}$ is greater than or equal to 1.1.

4. The turbomachine of claim 1, wherein $m_1$ is equal to 3.34 when $M_{tip,c}^{(RL)}$ is less than 1.1.

5. The turbomachine of claim 1, wherein $\Delta y_1$ is equal to or greater than 0.0125 and less than 6.

6. The turbomachine of claim 1, wherein $\Delta y_1$ is equal to or greater than 0.04 and less than 6.

7. The turbomachine of claim 1, wherein $\Delta y_1$ is equal to or greater than 0.07 and less than 6.

8. The turbomachine of claim 1, wherein $\Delta y_1$ is equal to or greater than 0.1 and less than 6.

9. The turbomachine of claim 1, wherein the turbomachine has a gear ratio within a range equal to or greater than 3.2 and equal to or less than 5.0.

10. The turbomachine of claim 1, wherein the fan blade includes an airfoil portion made from a polymer matrix composite (PMC) material, a metallic leading edge, the ratio c/D is between 0.16 and 0.21, and the fan has between 16 and 25 fan blades.

11. The turbomachine of claim 1, wherein ratio c/D is within a range equal to or greater than 0.1 and equal to or less than 0.3.

12. The turbomachine of claim 1, wherein FPR is within a range equal to or greater than 1.2 and equal to or less than 1.5.

13. A turbomachine comprising:
   an annular casing; and
   a fan disposed inside the annular casing and mounted for rotation about an axial centerline, the fan including fan blades that extend radially outwardly toward the annular casing;
   wherein the fan includes a fan hub-to-tip ratio ("HTR"), a fan blade count ("BC"), a fan pressure ratio ("FPR"), and a redline corrected fan tip Mach number ("$M_{tip,c}^{(RL)}$") according to a Second Performance Factor ("SPF"),
   wherein $$SPF = \sqrt{\frac{\pi}{4}(1-HTR^2)} / \left(\frac{BC}{20}\right) / \left(\frac{\sqrt{FPR-1}}{\sqrt{0.4}}\right) / M_{tip,c}^{(RL)} - 0.97,$$

wherein $m_2 \cdot [M_{tip,c}^{(RL)} - 1.1] + 1.5 > SPF > m_2 \cdot [M_{tip,c}^{(RL)} - 1.1] + \Delta y_2$, and
   wherein $0 < \Delta y_2 < 1.5$.

14. The turbomachine of claim 13, wherein $M_{tip,c}^{(RL)}$ is within a range equal to or greater than 0.45 and equal to or less than 1.34.

15. The turbomachine of claim 13, wherein $m_2$ is equal to 0.41 when $M_{tip,c}^{(RL)}$ is greater than or equal to 1.1.

16. The turbomachine of claim 13, wherein $m_2$ is equal to 0.55 when $M_{tip,c}^{(RL)}$ is less than 1.1.

17. The turbomachine of claim 13, wherein $\Delta y_2$ is equal to or greater than 0.0075 and less than 1.5.

18. The turbomachine of claim 13, wherein $\Delta y_2$ is equal to or greater than 0.02 and less than 1.5.

19. The turbomachine of claim 13, wherein $\Delta y_2$ is equal to or greater than 0.04 and less than 1.5.

20. The turbomachine of claim 13, wherein $\Delta y_2$ is equal to or greater than 0.06 and less than 1.5.

21. The turbomachine of claim 13, wherein the turbomachine has a gear ratio within a range equal to or greater than 3.2 and equal to or less than 5.0.

22. The turbomachine of claim 13, wherein the fan blade includes an airfoil portion made from a polymer matrix composite (PMC) material, a metallic leading edge, the ratio c/D is between 0.16 and 0.21, and the fan has between 16 and 25 fan blades.

23. The turbomachine of claim 13, wherein HTR is within a range equal to or greater than 0.1 and equal to or less than 0.5.

24. The turbomachine of claim 13, wherein BC is within a range equal to or greater than 10 and equal to or less than 18.

25. The turbomachine of claim 13, wherein FPR is within a range equal to or greater than 1.2 and equal to or less than 1.5.

* * * * *